United States Patent
Mochizuka

(10) Patent No.: US 6,618,180 B2
(45) Date of Patent: Sep. 9, 2003

(54) ELECTROCHROMIC MIRROR WITH HIGH CORROSION RESISTANT FILM

(75) Inventor: Takuo Mochizuka, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 09/736,829

(22) Filed: Dec. 14, 2000

(65) Prior Publication Data
US 2001/0010590 A1 Aug. 2, 2001

(30) Foreign Application Priority Data
Jan. 27, 2000 (JP) .......................... 2000-018511

(51) Int. Cl.⁷ .............................. G02F 1/15; G02F 1/153
(52) U.S. Cl. ...................... 359/265; 359/267; 359/273; 359/274
(58) Field of Search .................. 359/265, 273, 359/270, 274, 275, 267, 601, 602, 603, 604, 608

(56) References Cited

U.S. PATENT DOCUMENTS 5,864,419 A * 1/1999 Lynam ...................... 359/265
6,074,066 A * 6/2000 Macher et al. .............. 359/601
6,356,376 B1 * 3/2002 Tonar et al. ................ 359/267

* cited by examiner

Primary Examiner—Hung Xuan Dang
Assistant Examiner—Tuyen Tra
(74) Attorney, Agent, or Firm—Hedman & Costigan, P.C.

(57) ABSTRACT

A solid type EC mirror with improved corrosion resistance of its reflecting metal film is provided. On one surface (i.e., rear surface as viewed from the side on which light is incident) of a glass substrate are successively laminated an ITO transparent electrode film and an EC device consisting of three layers of an anode compound film, a solid electrolyte film and a cathode compound film. On the surface thereof are further successively laminated a high reflecting metal material film and a high corrosion resistant metal film. Since the high reflecting metal material film is covered with the high corrosion resistant metal film, a corrosion prevention effect against corrosion by moisture permeating from outside is enhanced and an offset width of the EC mirror can be reduced and a range of effective field of view can be enlarged.

3 Claims, 4 Drawing Sheets

ELECTROCHROMIC MIRROR WITH HIGH CORROSION RESISTANT FILM

BACKGROUND OF THE INVENTION

This invention relates to an electrochromic (hereinafter referred to as "EC") mirror using an EC device which is used for a dimming mirror, a dimming window, and so on, and more particularly, to a reflecting film structure of a solid type EC mirror in which an electrolyte is made of solid.

An EC device is used for an automobile dimming mirror or dimming window by utilizing its capability of varying optical transmittance. As a prior art solid type EC mirror, known in the art is one having a structure as shown in FIG. 2. On one surface (i.e., rear surface as viewed from the side on which light is incident) of a transparent glass substrate 2 are laminated a transparent electrode film 4, an EC device 11 consisting of three layers of an anode compound film 6, a solid electrolyte film 8 and a cathode compound film 10, and an Al reflecting electrode film 12. A part of the Al reflecting electrode film 12 constitutes a wiring 12a which extends along an end surface of the EC device 11, and is electrically connected to a cathode side electrode section 18 provided on the glass substrate 2 through a portion of the transparent electrode film 4. The transparent electrode film 4 is separated in upper and lower portions by a slit 15 which is formed in the vicinity of the lower end portion of the EC device 11 by means of, e.g., laser beam cutting. Short-circuiting between an anode side electrode section 17 and the cathode side electrode section 18 through the transparent electrode film 4 is prevented by this slit 15. The slit 15 may theoretically be formed at a location immediately above the lower end of the EC device 11 but, in actuality, the slit 15 is formed at a location which is about 1 mm above the lower end of the EC device 11, having regard to a positioning error in forming the slit 15. Since the slit 15 is seen as a line with a human eye, it is necessary as a product to conceal this slit 15 with a mirror holder. For this reason, the region of about 1 mm from the lower end of the EC device 11 is excluded from the scope of the reflecting mirror as a slit required width 2c. On the other hand, in the upper end portion of the Al reflecting electrode film 12, an insulation width 2d of about 0.5 mm from the upper end of the EC device 11 is provided for preventing forming of the Al reflecting electrode film 12 in contact with the transparent electrode film 4, having regard to a positioning error in forming the Al reflecting electrode film 12. The portion of the insulation width 2d has no function of a reflecting mirror because the Al reflecting electrode film 12 is not formed in this portion. The surface of the Al reflecting electrode film 12 is sealed with a sealing resin 14 which protects the Al reflecting electrode film 12 from outside moisture or soil and thereby prevents corrosion of the Al reflecting electrode film 12 with moisture. On the surface of the sealing resin 14 is mounted a sealing glass 16 for enhancing stability against variations in outside temperature and humidity.

In the structure of the EC mirror shown in FIG. 2, moisture contained in the air tends to permeate into mirror structure through the outer periphery (i.e., surface exposed to the air) of the sealing resin 14 by reason of variations in temperature and humidity. The moisture which has permeated from the sealing resin 14 corrodes the surface of the Al reflecting electrode film 12 which is in contact with the sealing resin 14 and the wiring 12a which is a part of the Al reflecting electrode film 12.

A disadvantage which is caused by corrosion of the Al reflecting electrode film 12 is that a reflection image becomes inaccurate. Another disadvantage is that aluminum becomes an insulating material ($Al_2O_3$) by corrosion. By changing of the wiring 12a to an insulating material, electric current which is necessary for coloring and discoloring the EC device 11 can not flow sufficiently and uniformly to the Al reflecting electrode film 12 whereby there occur irregularity in coloring of the EC device and decrease in the coloring and discoloring speeds.

For preventing corrosion of the Al reflecting electrode film 12, it is necessary to form the sealing resin to a sufficient thickness (e.g., about 3 mm) thereby to prevent permeating of moisture accurately. For forming the sealing resin 14 to a sufficient thickness, the EC device 11 and the Al reflecting electrode film 12 must be formed with their outer peripheries being offset sufficiently inwardly (about 3 mm) from the outer peripheral surface of the glass substrate 2 for providing, as the thickness of the sealing resin 14, an offset width 2b of about 3 mm in which the EC device 11 and the Al reflecting electrode film 12 are not formed. For this reason, the outer peripheral portion of the glass substrate 2 of a range including the offset width 2b for providing the sealing resin, the slit required width 2c and insulation width 2d cannot be used as a reflecting surface and a remaining range 2a of an effective field of view is rather narrow. Further, this arrangement requires a mirror holder 3 for concealing the portion excluding the range 2a of the effective field of view has a large width and appears awkward.

It is, therefore, an object of the present invention to provide a solid type EC mirror having an enlarged range of effective field of view by improving resistivity to corrosion of a reflecting electrode film such as an Al reflecting electrode film.

SUMMARY OF THE INVENTION

For achieving the above described object of the invention, there is provided an electrochromic mirror comprising a transparent substrate, a first conductive film, an anode or cathode compound film, a solid electrolyte film, a cathode or anode compound film, and a second conductive film, these films being successively laminated on one surface of the transparent substrate, and said second conductive film consisting of a laminate formed by laminating, from the side of the cathode or anode compound film, at least two layers of a high reflecting metal material film and a high corrosion resistant metal film.

According to the present invention, since the high corrosion resistant metal film is formed on the surface of the high reflecting metal material film, moisture contained in the outside air is interrupted by the high corrosion resistant metal film and the high reflective metal material film can thereby be protected from corrosion. The corrosion resistance of the high reflecting metal material film is thereby improved and, as a result, good visibility can be maintained and decrease in the coloring and discoloring function of the EC device can be prevented. Besides, the high corrosion resistant metal film can be formed in a thinner shape than the prior art sealing resin while securing the function of protecting the reflecting film and, therefore, the offset width can be reduced and the range of effective field of view can thereby be enlarged.

The high reflecting metal material film may be made of a semitransparent film. According to this aspect of the invention, reflection by the high reflecting metal material film and the high corrosion resistant reflecting metal film can be obtained and, therefore, a higher reflectance than in the case where only the high corrosion resistant metal film is used can be obtained. Further, since the amount of the high reflecting metal material film used can be reduced, the cost of material can be reduced even when an expensive high reflecting metal material is used.

The high reflecting metal material film may be made of a film which does not transmit light.

In one aspect of the invention, the high corrosion resistant metal film may extend to the transparent substrate or to the vicinity of the transparent substrate along end surfaces of the high reflecting metal material film, the cathode or anode compound film, the solid electrolyte film and the anode or cathode compound film so that the extended portion may be used as a wiring.

In one aspect of the invention, the laminate of the high reflecting metal material film and the high corrosion resistant metal film may extend to the transparent substrate or to the vicinity of the transparent substrate along end surfaces of the cathode or anode compound film, the solid electrolyte film and the anode or cathode compound film so that the extended portion may be used as a wiring.

In both cases, since the wiring made of the high corrosion resistant metal film is hardly corroded, sufficient current necessary for coloring or discoloring the EC device can be caused to flow whereby irregularity in coloring of the EC mirror and reduction in the coloring and discoloring speeds can be prevented.

The electrochromic mirror of the invention may further comprise a sealing resin layer made, for example, of a resin film, epoxy resin or coating provided on the surface of the high corrosion resistant metal film and a sealing substrate made, for example, of glass, plastic or metal provided on the surface of the sealing resin layer. By this arrangement, a high degree of resistance to environmental changes such as abrupt change in temperature and humidity of the outside air and corrosion resistance to moisture can be provided. Since, in this case, corrosion resistance is provided by the high corrosion resistant metal, the sealing resin layer can be made thinner than the prior art one whereby the offset width can be reduced and the range of effective field of view can be enlarged.

In one aspect of the invention, the high reflecting metal material film may contain Sn, Ag, Al or Rh as a principal ingredient.

In still another aspect of the invention, the high corrosion resistant metal film may contain Cr or Ni as a principal ingredient.

Description of preferred embodiments of the invention will be made below with reference to the accompanying drawings.

BRIEF DESCRIPTION OF THE DRAWINGS

In the accompanying drawings.

DESCRIPTION OF PREFERRED EMBODIMENTS

Figure 1:
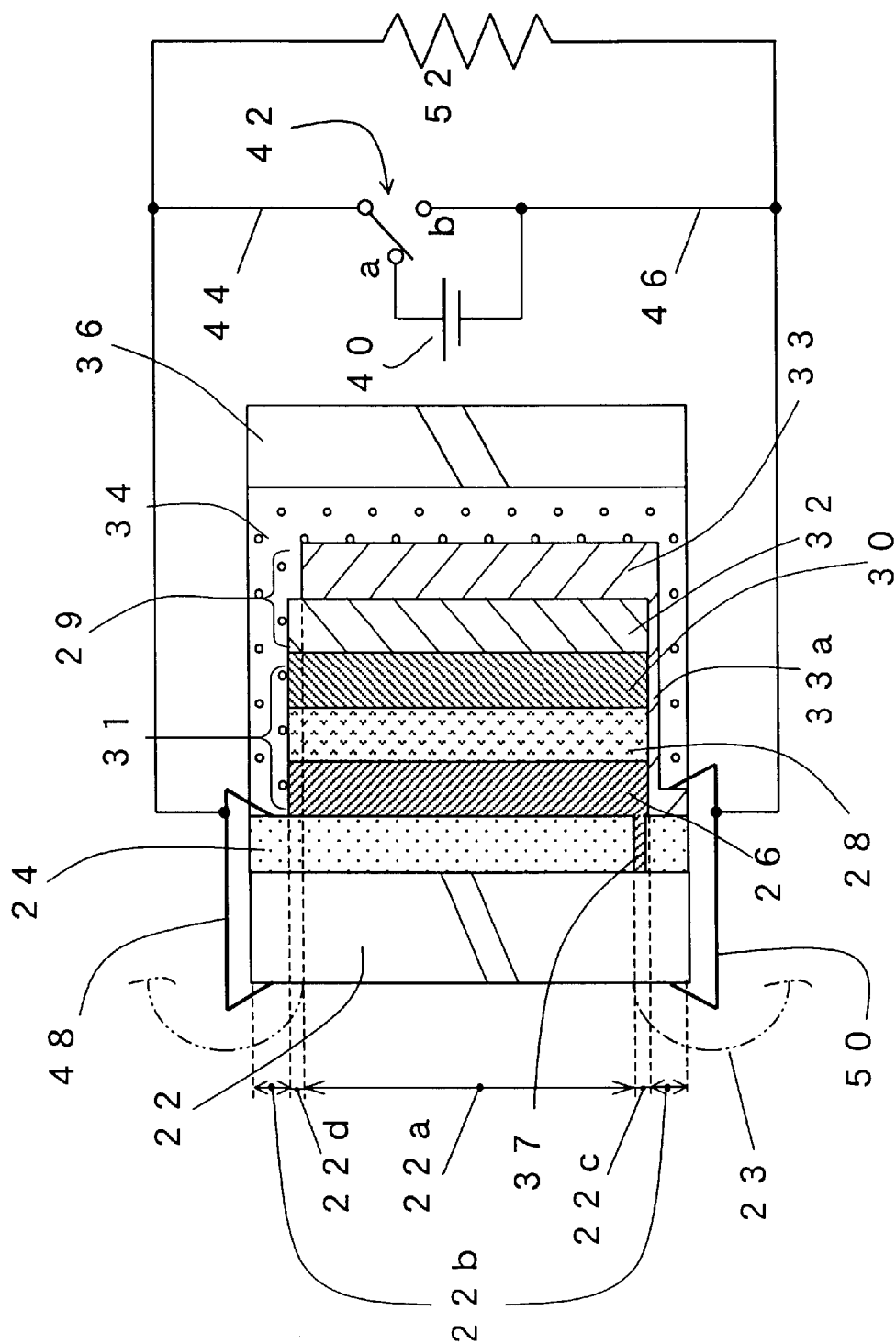
FIG. 1 is a sectional view showing schematically an embodiment of the EC mirror of the invention.

In the embodiment of FIG. 1, on one surface (i.e., rear surface as viewed from the side on which light is incident) of a colorless, transparent glass substrate 22 is formed, by vapor deposition, sputtering or other method, an ITO transparent electrode film 24 which constitutes a first conductive film. On the surface of the ITO transparent electrode film 24 are successively laminated, by vapor deposition, sputtering or other method, three layers of an anode compound film 26 made, e.g., of Ir—Sn, a solid electrolyte film 28 made, e.g., of $Ta_2O_5$ and a cathode compound film 30 made, e.g., of $WO_3$ which three layers constitute an EC device 31. On the surface of the EC device 31 are successively laminated, by vapor deposition, sputtering or other method, a high reflecting metal material film 32 made, e.g., of Al and a high corrosion resistant metal film 33 made, e.g., of Cr. These films 32 and 33 constitute a second conductive film 29. The high reflecting metal material film 32 in this embodiment is formed in thickness which enables the film 32 to constitute a light transmitting film. A part of the high corrosion resistant metal film 33 constitutes a wiring 33a which extends along the end surface of the EC device 31 and is electrically connected to a cathode side electrode section 50 which is formed in the form of a clip and is mounted on one end portion (e.g., the lower end portion) of the glass substrate 22. The surface of the high corrosion resistant metal film 33 and the entire outer peripheral surface of the laminate of the films 24, 31, 32 and 33 are sealed with a sealing resin 34 made, e.g., of a resin film, epoxy resin or coating. On the surface of the sealing resin 34 is mounted a sealing glass 36 which is provided for enhancing stability against change in temperature and humidity of the outside air. The ITO transparent electrode film 24 is electrically connected to an anode side electrode section 48 which is formed in the form of a clip and is mounted on the other end portion (e.g., the upper end portion) of the glass substrate 22.

The ITO transparent electrode film 24 is separated in upper and lower portions by a slit 37 which is formed at a location which is distant by about 1 mm from one end (the lower end in the illustrated embodiment) of the EC device 31. Short-circuiting between the anode side electrode section 48 and the cathode side electrode section 50 is prevented by this slit 37. A slit required width 22c between the end surface of the EC device 31 and the position of forming of the slit 37 is excluded from the range of the reflecting mirror.

Having regard to simplicity in the manufacturing process, the high reflective metal material film 32 is formed in the same manufacturing process as the EC device 31 (i.e., by using the same mask). For this reason, the high reflecting metal material film 32 is not formed with an insulation width so that there is possibility that the film 32 is formed partly in contact with the ITO transparent electrode film 24. Since, however, the high reflecting metal material film 32 in this embodiment is formed so thinly that it constitutes a semi-transparent film and, therefore, even if the film 32 is partly in contact with the ITO transparent electrode film 24, contact resistance is so great that short-circuiting state will not result. In contrast, the high corrosion resistant metal film 33 is provided with an insulation width 22d of about 0.5 mm from one end (the upper end in the illustrated embodiment) of the EC device 31. In this mirror, a part of incident light is reflected on the surface of the high reflecting metal material film 32 and light which is transmitted through the high reflecting metal material film 32 is reflected on the high corrosion resistant metal film 33. Thus, the high reflecting metal material film 32 and the high corrosion metal film 33 as a whole secure reflectance required for an automobile mirror. Since the high corrosion resistant metal film 33 is not formed in the portion of the insulation width 22d, sufficient reflectance cannot be obtained in this portion.

When a switch 42 (e.g., analog switch) is not connected to a contact a, potential of positive polarity is provided from a power source 40 (e.g., a battery of an automobile) to the anode side electrode section 48 through a wiring 44 and potential of negative polarity is provided to the cathode side electrode section 50 through a wiring 46. In a case where the switch 42 is connected to the contact a, the EC mirror becomes a dimming state (colored state) by reason of oxidation-reduction reaction of the EC device 31. Since the slit 37 is formed in a part of the ITO transparent electrode film 24, short-circuiting between the anode side electrode section 48 and the cathode side electrode section 50 through the ITO transparent electrode film 24 is prevented.

Upon connecting the switch 42 to a contact b, the anode side electrode section 48 is short-circuited with the cathode side electrode section 50 and the EC mirror is instantly discolored.

A resistor 52 is connected between the anode side electrode section 48 and the cathode side electrode section 50 in parallel to the switch 42. If a trouble occurs in a drive circuit for the EC device 31 when it is in the colored state, the switch 42 is turned to an open state but the anode side electrode section 48 and the cathode side electrode section 50 are gradually brought to zero potential equilibrium through the resistor 52 to discolor the EC device 31.

Since the automobile dimming mirror is used in an environment exposed to the outside air, an environment resistance test (temperature: 85° C., humidity: 80%, left for 720 hours etc.) is conducted and it is required that corrosion does not occur in the reflecting metal film. In the EC mirror shown in FIG. 1, the surface of the high reflecting metal material film 32 made of metal such as Al which is vulnerable to corrosion is covered with the high corrosion resistant metal film 33 made, e.g., of Cr and, therefore, moisture which may permeate from the outer peripheral surface (surface exposed to the outside air) of the sealing resin 34 is interrupted by the high corrosion resistant metal film 33 and does not reach the high reflecting metal material film 32 and corrosion of the high reflecting metal material film 32 thereby is prevented.

Since the corrosion prevention effect to the high reflecting metal material film 32 is enhanced by the provision of the high corrosion resistant metal film 33, thickness of the sealing resin 34, i.e., the offset width 22b of the EC device 31 can be reduced (to e.g., 2 mm or below). Accordingly, the range in which the EC device 31 cannot be formed can be reduced to about 2 mm from the outer peripheral surface of the glass substrate 22 and, therefore, a broad range 22a of the effective field of view which is left after excluding the offset width 22b, the slit required width 22c and the insulation width 22d from the glass substrate 22 can be provided. The portion excluding the range 22a of the effective field of view of the glass substrate 22 has no function of a reflecting mirror and a mirror holder 23 is provided for preventing an erroneous view. Since the wiring 33a is made of the high corrosion resistant metal film 33, the wiring 33a does not become an insulating material by corrosion but causes current necessary for coloring and discoloring the EC device 31 to flow whereby occurrence of irregularity in coloring of the EC mirror and reduction in the coloring and discoloring speeds can be prevented.

Figure 3:
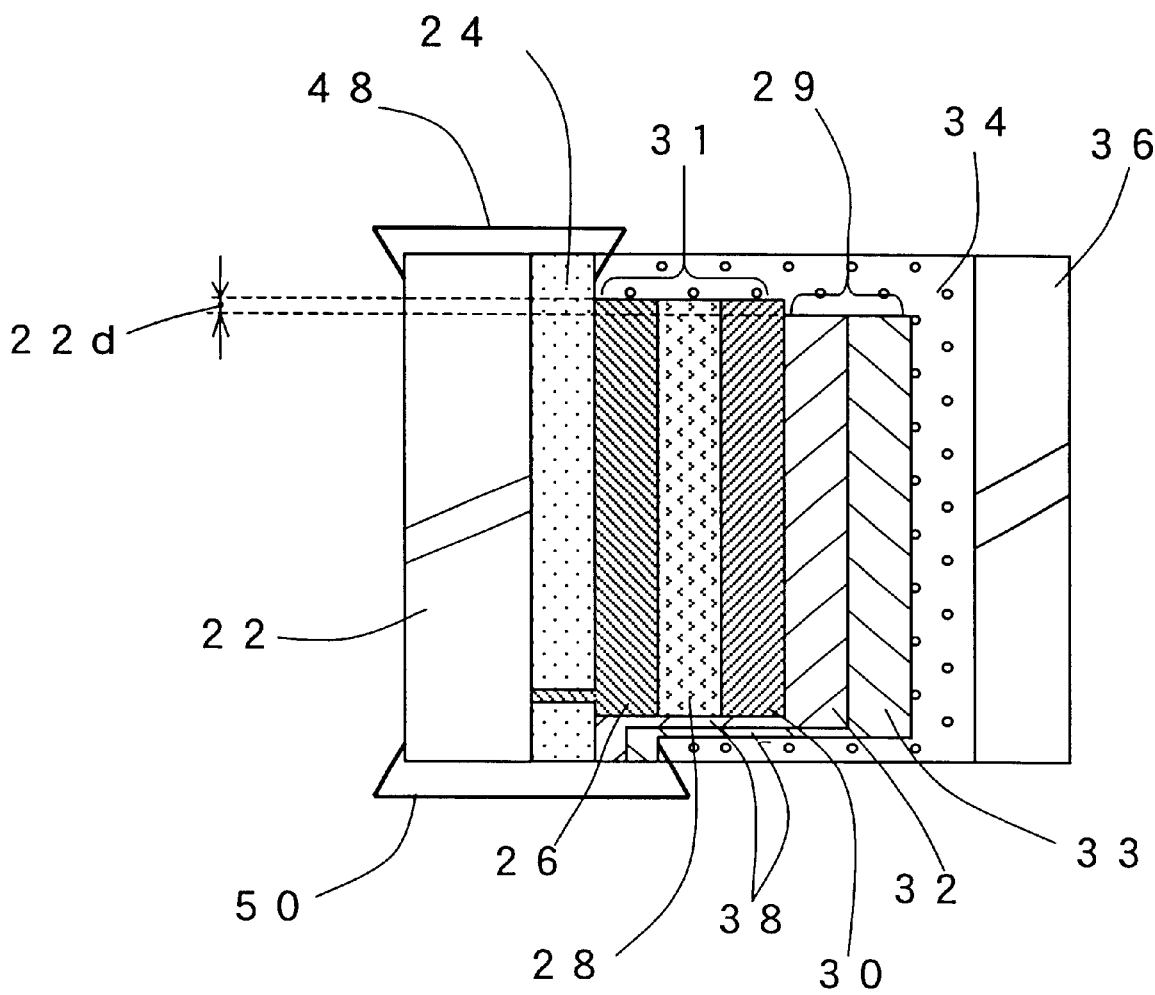
FIG. 3 is a sectional view showing schematically another embodiment of the invention.

Another embodiment of the invention is shown in FIG. 3. In FIG. 3, in the same manner as in the embodiment of FIG. 1, on one side of a glass substrate 22 is provided an ITO transparent electrode film 24 which constitutes a first conductive film. On the surface of the ITO transparent electrode film 24 is provided an EC device 31 which consists of three layers of an anode compound film 26, a solid electrolyte film 28 and a cathode compound film 30. On the surface of the EC device 31 is laminated, as a second conductive film 29, a high reflecting metal material film 32 made, e.g., of Al and a high corrosion resistant metal film 33 made, e.g., of Cr. The high reflecting metal material film 32 is formed in thickness which constitute a semitransparent thin film. For forming the high reflecting metal material film 32 and the high corrosion resistant metal film 33 in the same manufacturing process, an insulation width 22d is provided commonly for the two films 32 and 33. A part of the laminate of the high reflecting metal material film 32 and the high corrosion resistant metal film 33 constitutes a wiring 38 which extends along the end surface of the EC device 31 and is electrically connected to a cathode side electrode section 50 which is mounted on one end portion (e.g., the lower end portion) of the glass substrate 22. The surface of the high corrosion resistant metal film 33 and the entire outer peripheral surface of the laminate of the films 24, 31, 32 and 33 are sealed with a sealing resin 34 made, e.g., of a resin film, epoxy resin or coating. On the surface of the sealing resin 34 is mounted a sealing glass 36 for enhancing stability against change in temperature and humidity of the outside air. The ITO transparent electrode film 24 is electrically connected to an anode side electrode section 48 which is mounted on the other end portion (e.g., the upper end portion) of the glass substrate 22. Since the power source and wiring connected thereto are the same as those in the embodiment of FIG. 1, illustration and explanation of this portion will be omitted.

Figure 4:
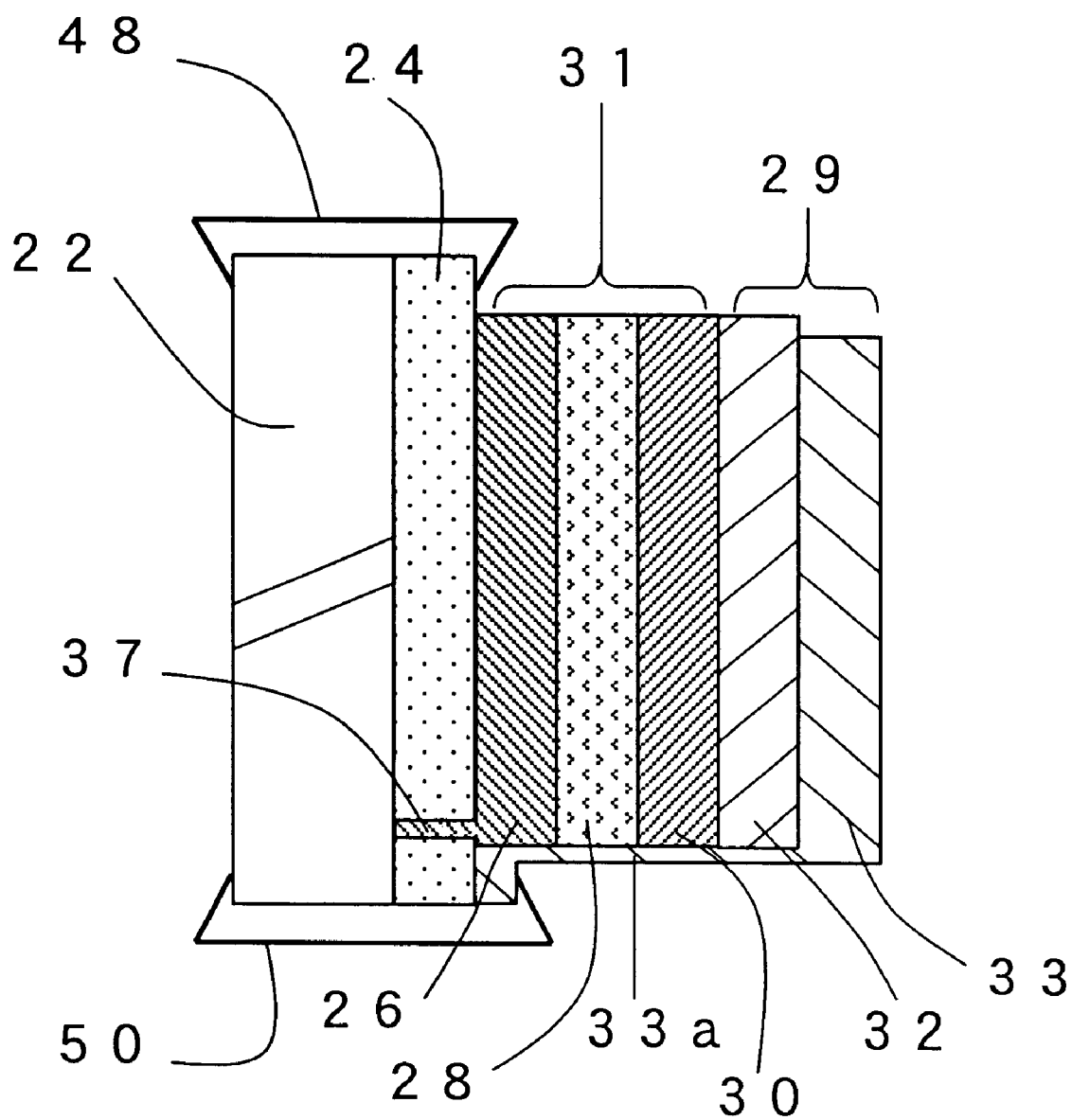
FIG. 4 is a sectional view showing schematically still another embodiment of the invention.

Another embodiment of the invention is shown in FIG. 4. In the same manner as in the embodiment of FIG. 1, on one side of a glass substrate 22 is provided an ITO transparent electrode film 24. On the surface of the ITO transparent electrode film 24 is provided an EC device 31 which consists of three layers of an anode compound film 26, a solid electrolyte film 28 and a cathode compound film 30. On the surface of the EC device 31 is laminated, as a second conductive film 29, a high reflecting metal material film 32 made, e.g., of Al and a high corrosion resistant metal film 33 made, e.g., of Cr. A part of the high reflecting metal material film 32 and the high corrosion resistant metal film 33 constitutes a wiring 33a which extends along the end surface of the EC device 31 and is electrically connected to a cathode side electrode section 50 mounted on one end portion (e.g., the lower end portion) of the glass substrate 22. The ITO electrode film 24 is electrically connected to an anode side electrode section 48 mounted on the other end portion (e.g., the upper end portion) of the glass substrate 22. The power source and wiring connected thereto are the same as those in the embodiment of FIG. 1.

Figure 2:
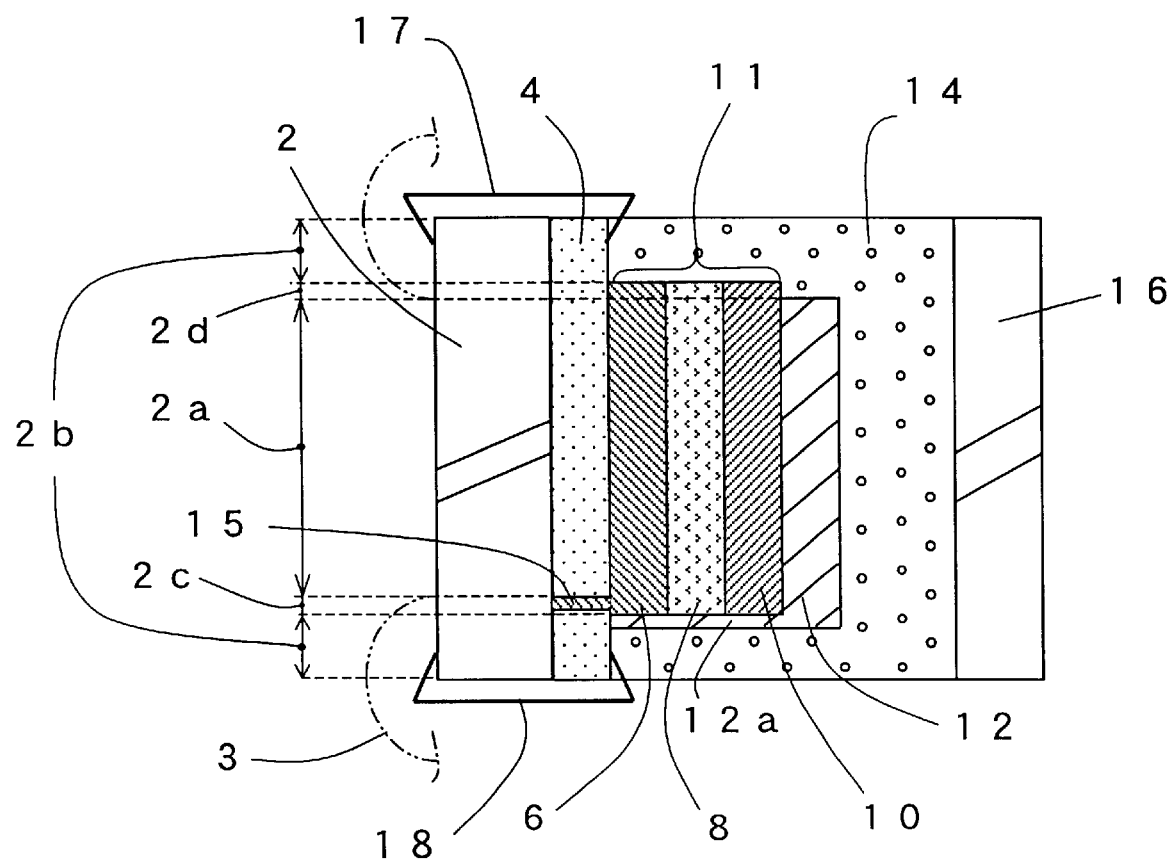
FIG. 2 is a sectional view showing schematically a prior art EC mirror.

According to the embodiment of FIG. 4, as is different from the structure of FIGS. 1 and 2, the sealing resin 34 and the sealing glass 36 are not provided. In a case where the EC mirror is used in a location where an environmental change is relatively small, the high corrosion resistant metal film 33 only may be able to perform a sufficient corrosion prevention effect against corrosion of the high reflecting metal material film 32 by the outside air. In such case, the process of forming the sealing resin 34 and the sealing glass 36 can be omitted and the cost of material thereby can be saved.

It is also possible to realize an exterior or interior rearview mirror having a structure in which the surface of the high corrosion resistant metal film 33 and the entire outer peripheral surface of the films 24, 31, 32 and 33 in the structure of FIG. 4 are covered and sealed with a sealing resin (34 in FIGS. 1 and 2) made, e.g., of a resin film, epoxy resin or coating while the sealing glass 36 is not provided.

In the above described embodiments, the positions of the anode compound film 26 and the cathode compound film 30 may be exchanged. In the above described embodiments, the high reflecting metal material film is made of a very thin film to form a semitransparent film. Alternatively, this film may be formed in the form of small islands (spots) to form a semitransparent film. Further, the high reflecting metal material film is not limited to a semitransparent film but it may be formed to a film which does not transmit light.

EXAMPLE

An example of the invention will be described below. In this example, the EC mirror of FIG. 4 is used to form an automobile dimming mirror.

The glass substrate 22 was formed in the size of an automobile rear-view mirror (about 100 by 200 mm). The ITO transparent electrode film 24 was formed on the glass substrate 22. On the surface of the ITO transparent electrode film 24 were successively laminated, by ion plating using a high frequency electric field in a vacuum, the anode compound film 26 made of Ir—Sn, the solid electrolyte film 28 made of $Ta_2O_5$, the cathode compound film 30 made of $WO_3$ and the high reflecting metal material film 32 made of Al. The film thicknesses of these films were 50 nm, 500 nm, 500 nm and 30 nm respectively. On the surface of the high reflecting metal material film 32 was formed, by vapor deposition, the high corrosion resistant metal film 33 made of Cr. The film thickness of the high corrosion resistant metal film 33 was about 100 nm. The power source and wiring were made in the same manner as described in the embodiment of FIG. 1.

In a state where no voltage is applied, this EC dimming mirror exhibited reflectance of 50%. When the switch 42 was connected to the contact a and voltage of 1.3V was applied, reflectance changed to 8%. When the switch was connected to the contact b, the two electrodes were short-circuited and reflectance was restored to 50% whereby it was confirmed that this EC mirror had excellent characteristics as an EC dimming mirror.

What is claimed is:

1. An electrochromic mirror comprising:

a transparent substrate;

a first conductive film;

an anode or cathode compound film;

a solid electrolyte film;

a cathode or anode compound film; and a second conductive film, these films being successively laminated on one surface of the transparent substrate, said second conductive film consisting of a laminate formed by laminating, from the side of the cathode or anode compound film, at least two layers of a high reflecting metal material film and a high corrosion resistant metal film; and wherein the high reflecting metal material film is made of different material from the high corrosion resistant metal film; wherein the high corrosion resistant metal film extends to the transparent substrate or to the vicinity of the transparent substrate along end surface of the high reflecting metal material film, the cathode or anode compound film, the solid electrolyte film and the anode or compound film.

2. An electrochromic mirror comprising:

a transparent substrate;

a first conductive film;

an anode or cathode compound film;

a solid electrolyte film;

a cathode or anode compound film; and a second conductive film, these films being successively laminated on one surface of the transparent substrate, said second conductive film consisting of a laminate formed by laminating, from the side of the cathode or anode compound film, at least two layers of a high reflecting metal material film and a high corrosion resistant metal film; and wherein the high reflecting metal material film is made of different material from the high corrosion resistant metal film; wherein the laminate of the high reflecting metal film and the high corrosion resistant metal film extends to the transparent substrate or to the vicinity of the transparent substrate along end surface of the cathode or anode compound film, the solid electrolyte film and the anode or cathode compound film.

3. An electrochromic mirror comprising:

a transparent substrate;

a first conductive film;

an anode or cathode compound film;

a solid electrolyte film;

a cathode or anode compound film; and a second conductive film, these films being successively laminated on one surface of the transparent substrate, said second conductive film consisting of a laminate formed by laminating, from the side of the cathode or anode compound film, at least two layers of a high reflecting metal material film and a high corrosion resistant metal film; and wherein the high reflecting metal film has a higher reflectance than that of the high corrosion resistant metal film, and the high corrosion resistant metal film interrupts moisture contained in the outside air and the high reflective metal material film can thereby be protected from corrosion and the corrosion resistance of the high reflecting metal material film is thereby improved.

* * * * *